United States Patent
Terraillon

[11] 3,910,366
[45] Oct. 7, 1975

[54] WEIGHING

[75] Inventor: Marc Terraillon, Gaillard, France

[73] Assignee: Terraillon, Annemasse, France

[22] Filed: Mar. 21, 1975

[21] Appl. No.: 560,738

[30] Foreign Application Priority Data
Apr. 24, 1974 Switzerland.......................... 5601/74

[52] U.S. Cl................................. 177/225; 177/239
[51] Int. Cl.² ...................... G01G 3/00; G01G 21/28
[58] Field of Search............ 177/225, 239, 256–259

[56] References Cited
UNITED STATES PATENTS

| | | | |
|---|---|---|---|
| 1,576,948 | 3/1926 | Cameron...................... | 177/225 UX |
| 1,824,698 | 9/1931 | Weber............................ | 177/239 X |
| 2,949,288 | 8/1960 | Provi............................. | 177/239 UX |
| 3,161,244 | 12/1964 | Hanssen......................... | 177/239 X |
| 3,193,034 | 7/1965 | Hutchinson et al............. | 177/239 X |
| 3,270,825 | 9/1966 | Kleinman....................... | 177/239 X |
| 3,460,642 | 8/1969 | Provi et al. .................... | 177/256 |

*Primary Examiner*—Jr. Miller
*Attorney, Agent, or Firm*—Pennie & Edmonds

[57] ABSTRACT

A weighing scales, the geometry of which provides maximum readability of scale graduations for housing area. The housing is round and includes a base adapted to be disposed on a support surface and an assembly including a support plate and a spaced platform connected thereto and movable axially relative to the base. A graduated scale is disposed on the support plate facing the platform and an index is positioned over the support plate for angular movement relative to the graduated scale within the assembly. The weighing scales includes a mechanism for translating an axial movement of the assembly to an angular movement of the index. Support means supports the assembly on the base and at least a portion of the platform concentric with the graduated scale is formed of transparent material for viewing the disposition of the index relative to the graduated scale.

4 Claims, 2 Drawing Figures

WEIGHING

BACKGROUND OF THE INVENTION

Weighing scales of the type disclosed herein, commonly referred to as a bathroom scales, are known to the prior art. Typically, the weighing scales includes a platform upon which a person to be weighed may stand, a base for supporting the weighing scales on a supporting surface, a read-out mechanism, structure for supporting the platform on the base and a kinematic mechanism for connecting the platform and the read-out mechanism. The connecting mechanism responds to movement of the platform under the weight of an individual in opposition to a returning force and operably to translate the extent of movement to the read-out mechanism so that a value indicative of the weight of the individual may be read at a viewing window. Representative of such prior is Greenfield U.S. Pat. No. 2,047,681.

While this form of weighing scales generally has been accepted certain disadvantages have been recognized. Significant among these is the size or geometrical outline of the weighing scales which has a housing area greater than that required for maximum readability of scale graduation. The increase in housing area is required to provide a location for the mounting of the platform on the base so that the mounting structure does not block or impede the movement of any structural component of the weighing scales in response to movement of the platform. If the attempt is to reduce the size or geometrical outline of the weighing scales the size of the read-out mechanism, also, must be reduced. The result is that the scale graduations become small and difficult to read. If, on the other hand, the scale graduations are presented in a size permitting ease in reading the housing area must increase. The result is that the weighing scales tends to become an obstruction when visible and is difficult to store.

BRIEF DESCRIPTION OF THE INVENTION

The weighing scales of the present invention overcomes the disadvantages noted heretofore. To this end, the weighing scales is formed in a geometrical outline thereby to provide a construction of reduced size which is adapted more readily to be disposed and not become an obstruction yet at the same time the geometrical outline incorporates therein a read-out whose scale graduations are large relative to the housing so that a scale reading may be obtained without magnification, as for example, by the use of a magnifying lens or the equivalent at the viewing location. The weighing scales of the present invention is formed to a round geometry and provides a read-out in the form of a scale graduation annulus and an index, the scale graduations and the index being relatively movable in response to axial movement of the platform of the weighing scales. The platform of the weighing scales is of unique construction having a supporting surface and a spaced apart plate member defining a substantially enclosed housing. The read-out is located within the housing and above both the support of the housing on the base of the weighing scales and the mechanism for translating movement of the housing to a movement of either the scale graduations or index relative to the other. In this manner the support and the mechanism may be located within the annulus of scale graduations. And the overall geometrical outline of the weighing scale will be smaller for maximum radial disposition of scale graduation.

Other advantages of the weighing scales of the present invention will readily make themselves apparent to those skilled in the art as the specification to be read in conjunction with the view of the attached drawings continues.

DETAILED DESCRIPTION OF THE PREFERRED EMBODIMENT

Figure 2:
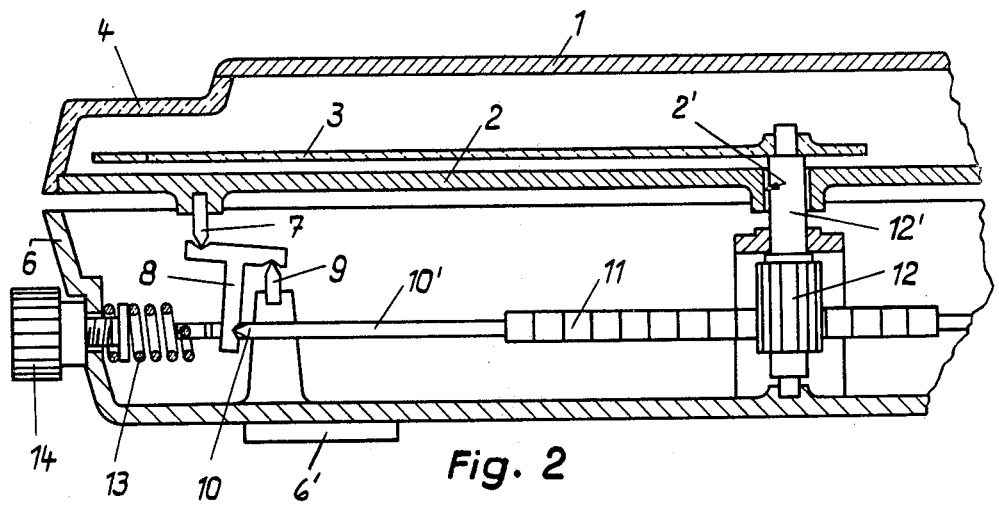
FIG. 2 is an enlarged vertical section as seen along the line 2—2 in FIG. 1.
Figure 1:
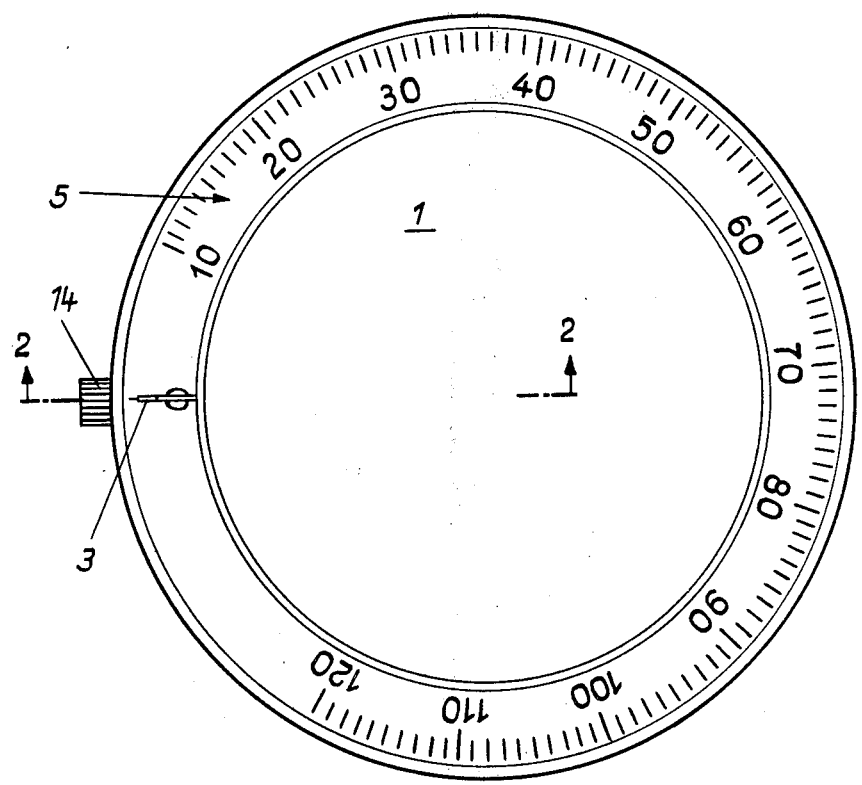
FIG. 1 is a top plan view of the weighing scales of the present invention.

The weighing scales of the present invention is illustrated to advantage in FIGS. 1 and 2 of the drawing and in the preferred embodiment the weighing scales is circular in outline. The weighing scales includes a base member 6 formed by a lower plate and a peripheral upstanding wall. The wall may be integral with the lower plate, inclined slightly outwardly and terminated at a rim which is disposed in a plane parallel to the plane of the lower plate. A plurality of feet 6' of conventional form and construction are carried by the lower plate. The feet are adapted to support the weighing scales on a supporting surface such as a floor (not shown).

The weighing scales further includes a platform 1 and a plate 2 which are spaced apart and in parallelism with the lower plate of base 6. The platform is mounted by any convenient means at the peripheral edge of the plate 2 and together with the plate forms an assembly which is both supported over the base and movable axially toward the base under the influence of the weight of an individual who shall stand on the platform 1.

The platform 1 has a central area providing a foot supporting surface and an outer ring portion 4. The foot supporting surface generally is flat in contour and the outer ring portion includes an upwardly extending leg, a downwardly extending leg and a web which connects the legs together. The upwardly extending leg joins with the central area and the downwardly extending leg is connected to the plate 2, as for example, by the cooperation of the plate in an inner annular cutout adjacent the end of the leg. As illustrated, the outer ring portion 4 may be formed of a plastic material such as polyethylene or one of the other recognized plastic materials which not only is capable of displaying sufficient strength for the purposes intended but also is transparent to provide a viewing area for obtaining a weight reading.

The central area of the platform 1 as is the plate 2 and base 6 may be formed of plastic or metal such as steel which likewise displays sufficient strength characteristics for the intended purposes.

Numerical indicia 5 in suitable graduation as illustrated in FIG. 1 and in an appropriate pound or kilogram scale is disposed on plate 2 in an annular array beneath the web of ring portion 4. Thus, the indicia is visible to the individual using the weighing scales. A movable index having a pointer 3 is mounted in the space between the platform 1 and plate 2 for movement rotationally relative to the scale from 0 for purposes of providing the reading which is indicative of the weight of the individual using the weighing scales. The index pointer returns to 0 when the weight is removed from the platform 1.

A mechanism now to be described mounts the assembly including platform 1 and plate 2 on the base 6 and converts axial movement of the assembly to arcuate travel of the index pointer 3. The mechanism and the radius of the annulus of indicia from the pivot of the index pointer 3 provide that the arcuate travel of the pointer at the annulus is greater than the axial travel of the platform 1 by some magnification factor. Thus, there is a magnification or multiplication of each increment of axial movement of the platform which enhances read-out capability.

The mechanism includes rocker members in the form of a pair of T-members 8 spaced apart along a sector line on one side of the axis of the weighing scales and a pair of T-members (not shown) which are spaced apart along a parallel sector line on the other side of the axis of the weighing scales. Each T-member is formed with a plurality of notches for receipt in each of a knife edge and as will be described undergoes a tilting movement in response to an axial movement of the platform 1. To this end each T-member includes a pair of notches in the upper span, one at the top left and the other at the bottom right. Each T-member also includes a notch in the leg. As illustrated, each leg is notched near the bottom at the right.

A plurality of bosses equal in number to the number of T-members are formed on the plate 2 on the side opposed to the space. Each boss supports a projection element including a knife edge 7 which is received within the left span notch. The knife edges also are disposed along sector lines parallel to the first described sector lines and preferably the knife edges are equidistantly spaced from the axis. In this manner, a proper balance of the platform on the base may be obtained.

A similar plurality of pedestals extend upwardly from the base 6 toward the plate 2. Each pedestal supports a projection element including a knife edge 9 which is received within the right span notch.

A member 10' or a pair of members spaced apart horizontally includes a knife edge 10 adjacent the opposite ends. Each member 10' is received between the T-members on opposite sides of the axis by the notches in the leg and moves horizontally of the platform in opposition to the bias of spring 13.

As may be apparent, a weight on the platform 1 translated to the knife edges 7 causes the T-members 8 to pivot counterclockwise about knife edges 9 so that the legs move each member 10' to the right against the action of the spring. When the weight is removed from the platform the member 10' acting on the legs as a result of spring action causes the T-members 8 again to pivot about knife edges 9 although in the clockwise direction, thereby to return the member 10' and the platform 1 to a position of equilibrium. At equilibrium the pointer 3 will be at the 0 reading. Adjustment of the pointer to 0 may be carried out in a conventional manner. To this end, a knob 14 connected to the spring 13 is rotated to adjust the tension of the spring. The knob may be somewhat recessed in the wall of the base 6.

A shaft 12' is supported axially of the weighing scales and journalled for rotation in a bearing formed in the base and a second bearing carried by the base below the plate 2. The shaft extends upwardly of the base through an opening 2' in the plate 2 and terminates below the platform 1. A pinion 12 is keyed or otherwise secured to the shaft for conjoint movement with the shaft.

A rack 11 is supported by a member 10' and engages with the pinion for driving the latter. The index and pointer 3 is supported by the shaft 12' and translates arcuately over the graduation of indicia 5 following linear movement of member 10' and rack 11 which is converted to rotary movement of pinion 12 and shaft 12'.

The weighing scales as described may be of low profile. Also, because of the magnification or multiplication of movement of the pointer 3 relative to the axial displacement of the platform 1 relative to the base 6 the displacement of the platform need only be small. The weighing scales displays the entire scale of graduations in ready view, and, moreover, the weighing scales has the advantage of displaying the scale graduation for maximum readability in a minimum housing area.

Having described the invention, what is claimed is:

1. A weighing scales comprising
   a. a base adapted to be disposed on a support surface,
   b. an assembly including
      1. a platform providing a standing surface for an individual to be weighed and
      2. a support plate, said support plate and platform being mounted in spaced-apart relation,
   c. a graduated scale disposed in an annular array on said support plate facing said platform,
   d. index means supported for angular movement over said graduated scale,
   e. means connecting said assembly and said index means, said connecting means being responsive to the weight of said individual thereby to translate axial movement of said assembly relative to said base to angular movement of said index means relative to said graduated scale,
   f. biasing means acting on said connecting means to oppose said axial movement of said assembly toward said base, and
   g. at least the portion of said platform concentric with said array being formed of transparent material so that a scale reading determined by the angular position of said index may be obtained.

2. The weighing scales according to claim 1 in which said platform is circular and including
   a. a fitted peripheral ring, said ring being formed of transparent material and mounted to said support plate.

3. The weighing scales according to claim 1 in which said platform is formed of transparent material.

4. The weighing scales according to claim 1 in which said connecting means includes
   a. a shaft, said shaft passing through a central aperture in said support plate, and said index means carried by said shaft.

* * * * *